United States Patent
Nagarajan et al.

(10) Patent No.: US 7,894,683 B2
(45) Date of Patent: Feb. 22, 2011

(54) REFORMATTING BINARY IMAGE DATA TO GENERATE SMALLER COMPRESSED IMAGE DATA SIZE

(75) Inventors: Ramesh Nagarajan, Pittsford, NY (US); Francis Kapo Tse, Rochester, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/606,523

(22) Filed: Oct. 27, 2009

(65) Prior Publication Data

US 2010/0046034 A1 Feb. 25, 2010

Related U.S. Application Data

(62) Division of application No. 10/709,386, filed on Apr. 30, 2004, now abandoned.

(51) Int. Cl.
G06K 9/36 (2006.01)
(52) U.S. Cl. .................. 382/239; 382/232; 358/3.07; 358/3.08
(58) Field of Classification Search ......... 382/232–253; 358/3.07, 3.08
See application file for complete search history.

(56) References Cited

U.S. PATENT DOCUMENTS

| | | | |
|---|---|---|---|
| 4,045,773 A | 8/1977 | Kadota et al. | |
| 4,403,340 A | 9/1983 | Kumpf et al. | |
| 4,513,442 A | 4/1985 | Scherl | |
| 4,590,606 A | 5/1986 | Rohrer | |
| 5,048,096 A | 9/1991 | Beato | |
| 5,347,374 A | 9/1994 | Fuss et al. | |
| 5,363,209 A | 11/1994 | Eschbach et al. | |
| 5,414,538 A | 5/1995 | Eschbach | |
| 5,450,502 A | 9/1995 | Eschbach et al. | |
| 5,581,370 A | 12/1996 | Fuss et al. | |
| 5,778,092 A | 7/1998 | MacLeod et al. | |
| 5,917,652 A | 6/1999 | Mathers et al. | |
| 5,917,952 A | 6/1999 | Noh | |

(Continued)

FOREIGN PATENT DOCUMENTS

JP A-60-77278 5/1985

(Continued)

OTHER PUBLICATIONS

Multiresolution Adaptive Speckle Filtering: a Comparison of Algorithms; B. Aiazzi, L. Alparone, S. Baronti, G. Boni; pp. 1054-1056.

(Continued)

*Primary Examiner*—John B Strege
*Assistant Examiner*—Sean Motsinger
(74) *Attorney, Agent, or Firm*—Oliff & Berridge, PLC (57) ABSTRACT

In various exemplary embodiments, systems include a segmentor to segment text binary image data to a first plane. A subtractor subtracts text binary image from binary image data to generate a non-text binary image data in a second plane. A converter converts non-text binary image data in the second plane into non-text gray scale image data in the second plane. A first compressor compresses the text gray scale image data in the first plane. A second compressor compresses the non-text gray scale image in the second plane.

8 Claims, 10 Drawing Sheets

U.S. PATENT DOCUMENTS

| | | |
|---|---|---|
| 6,175,427 B1 | 1/2001 | Lehmbeck et al. |
| 6,275,620 B2 * | 8/2001 | de Queiroz et al. .......... 382/270 |
| 6,304,684 B1 * | 10/2001 | Niczyporuk et al. ......... 382/318 |
| 6,343,159 B1 | 1/2002 | Cuciurean-Zapan et al. |
| 6,400,844 B1 | 6/2002 | Fan et al. |
| 6,633,411 B1 * | 10/2003 | Rao et al. ..................... 358/2.1 |
| 6,941,024 B2 * | 9/2005 | Mukherjee ................... 382/248 |
| 6,947,178 B2 * | 9/2005 | Kuo et al. ................... 358/3.08 |
| 7,079,686 B2 * | 7/2006 | Ahmed et al. ................ 382/176 |
| 7,120,297 B2 * | 10/2006 | Simard et al. ................ 382/166 |
| 7,266,250 B2 * | 9/2007 | Bloomberg et al. .......... 382/269 |
| 7,379,594 B2 | 5/2008 | Ferman et al. |
| 2002/0076103 A1 | 6/2002 | Lin et al. |
| 2002/0154339 A1 * | 10/2002 | Kuo et al. ................... 358/3.08 |
| 2004/0037473 A1 * | 2/2004 | Ahmed et al. ................ 382/254 |

FOREIGN PATENT DOCUMENTS

| | | |
|---|---|---|
| JP | A-60-116076 | 6/1985 |

OTHER PUBLICATIONS

IBM Technical Disclosure Bulletin, May 1973, pp. 3879-3883, "Line/Symbol Separation for Raster Image Processing."

Kodidis, Eleftherios et al. "Nonlinear Adaptive filters for Speckle Suppression in Ultrasonic Images," Signal Processing, Signal Processing v 52 n3 Aug. 1996, pp. 357-372.

Data Compression for Check Processing Machines, Yasuhiko Yasuda, Michel Dubois and Thomas S. Huang, Proceedings of the IEEE, vol. 68, No. 7, Jul. 1980.

IBM Technical Disclosure Bulletin, Oct. 1972, pp. 1531-1532, "Amount Line Finding Logic."

Digital Image Processing, Gonzalez and Woods, Prentice Hall 2002 p. 493.

International Telecommunications Union Standard ITU-T.44 Apr. 1999.

* cited by examiner

REFORMATTING BINARY IMAGE DATA TO GENERATE SMALLER COMPRESSED IMAGE DATA SIZE

This is a Division of application Ser. No. 10/709,386 filed Apr. 30, 2004. The disclosure of the prior application is hereby incorporated by reference herein in its entirety.

BACKGROUND OF THE INVENTION

1. Field of Invention

This invention is directed to reformatting binary image data.

2. Related Art

Binary image data means that each pixel in the image data is a discrete value "1" or "0" representing either a black pixel or a white pixel. Documents to be converted into binary image data are typically continuous tone images. Continuous tone image means that the image is represented by various shades of color or various shades of gray. Various processes can be used to convert continuous tone image into binary image data, and yet give an impression of continuous tone image.

One such process, the halftoning process uses a mathematically stored screen pattern. The process systematically compares each pixel's continuous tone value with the value of the screen. If the continuous tone value of the pixel is less dense than the screen value, a white pixel is produced. On the other hand, if the pixel value is more dense than the screen value, a black pixel is produced. Simply stated, the process converts a gray scale image or a color image into binary image data, but gives the impression of multiple gray levels by producing more white pixels for a less-dense area and more black pixels for a denser area.

A specific type of halftoning process called error diffusion is an adaptive binarization process which has the property of preserving the local average gray level of the input continuous tone image. Specifically, error-diffusion propagates the error generated during binarization to neighboring pixels.

SUMMARY OF THE DISCLOSURE

Binary image data of converted documents occupy a very large memory space in an image data processing system. Large binary image data also consumes large bandwidth when transmitted, for example, over a local or wide area network, over an intranet, an extranet or the Internet, or other distributed networks. Therefore, compression schemes, such as CCITT G3/G4 are used to reduce the size of the binary image data. However, binary image data that are error-diffused do not compress well using CCITT G3/G4.

Additionally, binary image data containing both high spatial frequency data and smoothly varying low spatial frequency data may not optimally compress well together. CCITT G3/G4 is a lossless compression scheme that compresses well on image data having binary text and/or line art image data or, in general, any high spatial frequency image data containing sharp edges or color transitions. CCITT G3/G4 does not compress well on image data or, in general, image data having smoothly varying low-spatial frequencies such as gradients and/or natural pictorial data. Instead, a lossy compression scheme such as JPEG, compresses well on smoothly varying low-spatial frequency image data.

Figure 1:
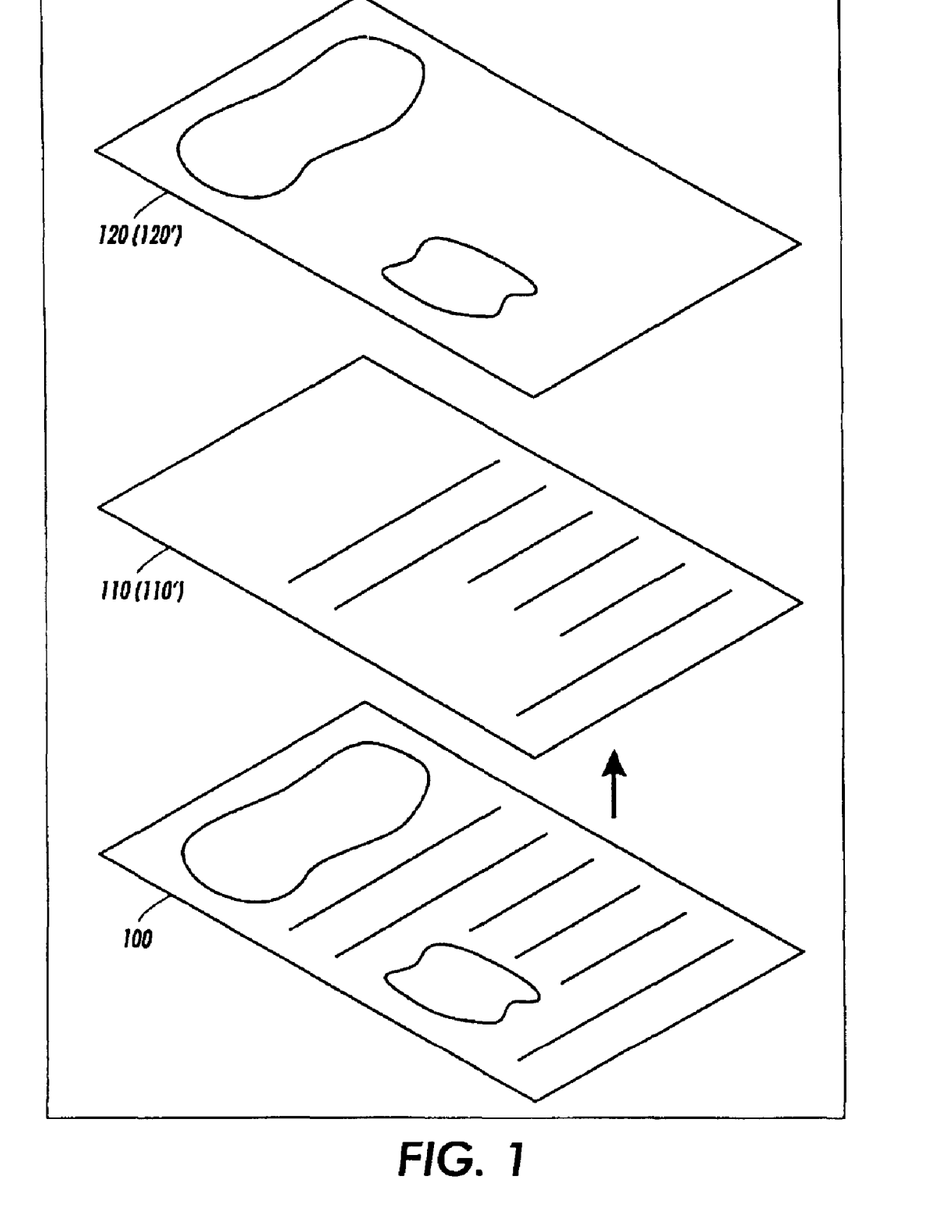
FIG. 1 illustrates one exemplary embodiment of an MRC format.

To accommodate for image data having different compression needs, a scheme such as the mixed raster content (MRC) format may be used. FIG. 1 illustrates one exemplary embodiment of an MRC format. A document 100 is segmented into a high frequency plane 110 (110') and a background plane 120 (120'). Although two planes are shown in the figure, it could be N planes depending on the application. The high frequency plane 110 (110') contains high spatial frequency image data. The background plane 120 (120') contains smoothly varying low spatial frequency image data. Segmenting the document 100 into the high frequency plane 110 (110') and the background plane 120 (120') provides for different compression schemes to be applied to different planes. Thus, the most appropriate compression scheme for each image data may be applied.

This invention provides systems and methods for reformatting binary image data into two or more planes.

This invention provides systems and methods for segmenting binary image data into text binary image data and non-text binary image data and creating two or more planes from the segmented binary image data.

This invention provides systems and methods for converting binary image data into gray scale image data and segmenting the gray image data into two or more planes.

This invention provides systems and methods for enhancing binary image data and/or gray scale image data during segmentation into two or more planes.

In various exemplary embodiments, the systems include a converter to convert binary image data into gray scale image data. A segmentor segments gray scale image data into high spatial frequency image data in a first plane and low spatial frequency image data in a second plane. A first compressor compresses the high spatial frequency image data in the first plane and a second compressor compresses the low spatial frequency image data in the second plane.

In various exemplary embodiments, the systems include a segmentor to segment binary image data into text binary image data in a first plane. A subtractor subtracts the text binary image data from binary image data to generate a non-text binary image data in a second plane. A converter converts non-text binary image data in the second plane into non-text gray scale image data. A first compressor compresses the text gray scale image data in the first plane and a second compressor compresses the non-text gray scale image in the second plane.

These and other features and advantages of various exemplary embodiments of systems and methods according to this invention are described in, or are apparent from, the following detailed description of various exemplary embodiments of the systems and methods according to this invention.

BRIEF DESCRIPTION OF DRAWINGS

Various exemplary embodiments of systems and methods of this invention will be described in detail, with reference to the following figures, wherein.

DETAILED DESCRIPTION OF EXEMPLARY EMBODIMENTS

Various exemplary embodiments of systems and methods according to this invention relate to scanned and/or printed color and/or black and white documents converted into binary image data. The systems and methods reformat binary image data to produce small, highly-compressed image data files that capture the original document content. According to various exemplary embodiments of systems and methods, output files are generated in accordance with the MRC format, which includes both TIFF and PDF standards, as well as the PostScript standard. While various exemplary embodiments of systems and methods refer to the MRC format, it should be appreciated that the techniques described herein may be implemented in other formats to achieve a desired result.

Figure 2:
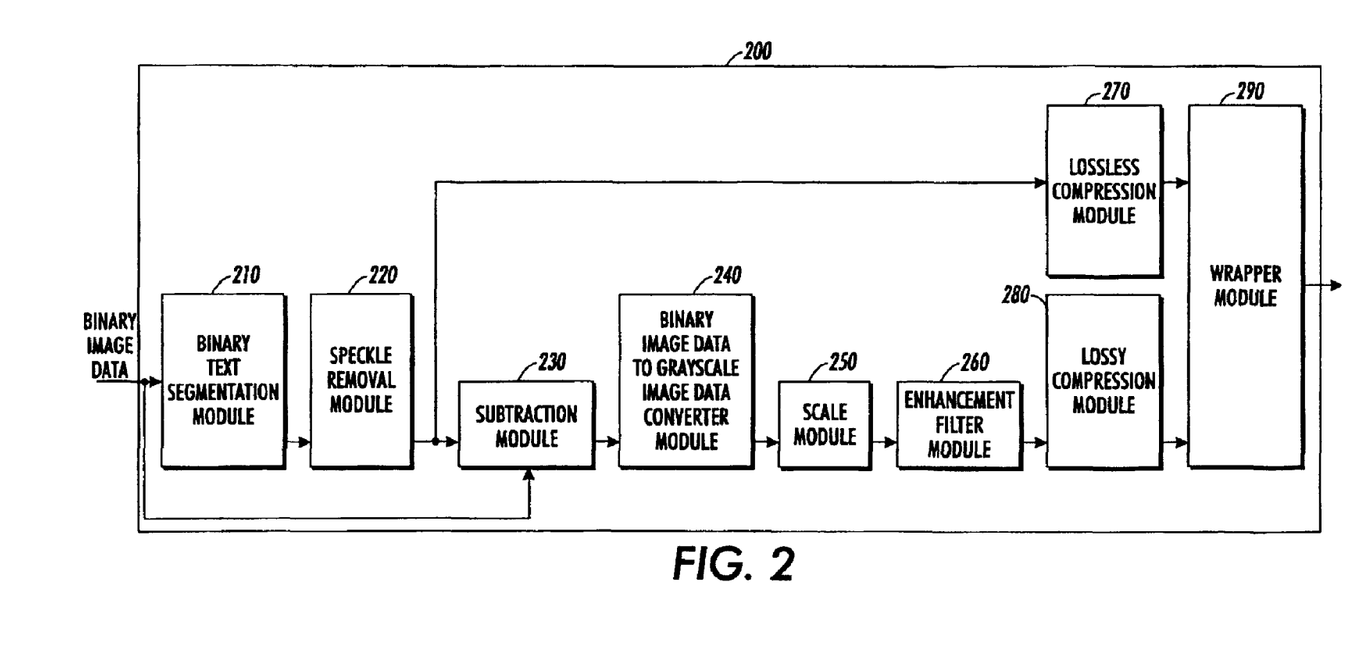
FIG. 2 illustrates an exemplary functional block diagram of a binary image data to MRC format generating system.

FIG. 2 illustrates a binary image data to MRC format generating system 200 according to one embodiment of the invention. The binary image data to MRC format generating system 200 may be a xerographic printer, a marking device, a multi-functional device, a digital photocopier, an ink-jet printer, a scanner, a facsimile machine, etc., suitable for storing and/or receiving and/or transmitting image data. The binary image data to MRC format generating system 200 includes a binary text segmentation module 210, a speckle removal module 220, a subtraction module 230, a binary image data to gray scale image data converter module 240, an optional scale module 250, an optional enhancement filter module 260, a lossless compression module 270, a lossy compression module 280 and a wrapper module 290.

The binary text segmentation module 210 receives binary image data from a data source. The binary text segmentation module 210 extracts binary text image data from the binary image data. The speckle removal module 220 receives the binary text image data. The binary text image data may contain speckle noise due to halftoning techniques such as error diffusion. The speckle removal module 220 removes speckle noise from the binary text image data to generate an enhanced binary text image data. The enhanced binary text image data becomes the high frequency plane 110 of the MRC format. The lossless compression module 270 receives the enhanced binary text image data. The lossless compression module 270 compresses the enhanced binary text image data, for example, using CCITT G3/G4 compression scheme. Alternatively a token-based compression could also be applied to the text image data, for example using JBIG2 compression. The compressed enhanced binary text image data is sent to the wrapper module 290.

In parallel, the enhanced binary text image data is sent to the subtraction module 230. The subtract module 230 subtracts the enhanced binary text image data from the binary image data to generate non-text binary image data. The binary image data to gray scale image data converter module 240 receives the non-text binary image data. The binary image data to gray scale image data converter module 240 converts the non-text binary image data to non-text gray scale image data. The scale module 250 and the enhancement filter module 260 are optional. The scale module 250 reduces the resolution of the non-text gray scale image data. For example, if the resolution of the non-text gray scale image data is X dpi, where X is an integer, the scale module 250 may reduce the resolution to X/2 dpi. The scaled non-text gray scale image data is sent to the enhanced filter module 260. The enhanced filter module 260 applies enhancement filters or tonal corrections to the scaled non-text gray scale image data to generate an enhanced non-text gray scale image data. The enhanced non-text gray scale image data becomes the background plane 120 of the MRC format. The enhanced non-text gray scale image data is sent to the lossy compression module 280. The lossy compression module 280 compresses the enhanced non-text gray scale image data, for example, using JPEG or JPEG2000 compression scheme. The compressed non-text gray scale image data is sent to the wrapper module 290. The wrapper module 290 creates one or more data files containing the compressed high frequency plane 110 and the background plane 120.

The binary text segmentation module 210 may be created using well known run length analysis and/or well known connected component analysis techniques. One run length analysis analyzes a number of contiguous black pixels in the same row or column of an image, thereby determining whether the contiguous black pixels are text or non-text. Such a technique is described in U.S. Pat. No. 4,590,606 to Rohrer; and in K. Kerchmar, "Amount Line Finding Logic", IBM Technical Disclosure Bulletin, Volume 15, No. 5, pages 1531 to 1532 (October 1972). Another run length analysis analyzes whether a particular portion of the image is text or non-text graphical information based upon the number or density of black pixels in that region or line of pixels. This technique is described in Japanese Patent No. JP 60-77278 to Isobe et al. and Japanese Patent No. JP 60-116076 to Iwase. Yet another run length analysis analyzes whether each segment is text or non-text graphical information based upon the statistical properties of the segment, as described in Yasuda et al., "Data Compression for Check Processing Machines", Proceedings of the IEEE, Volume 68, No. 7, pages 874 through 885 (July 1980).

Connected component analysis is a well-known technique that is also used to separate text from non-text in an image. Connected component analysis is used to identify individual text characters in an image. Such techniques are described in U.S. Pat. No. 4,403,340 to Kumpf, and U.S. Pat. No. 4,045,773 to Kadota. One connected component analysis technique separates text from non-text matter by determining whether a length of connected black pixels is statistically close to a predetermined text line length. This technique is described in U.S. Pat. No. 4,513,442 to Scherl.

A combination of run length analysis and connected component analysis may be used, for example, as described in Nolan, "Line/Symbol Separation for Raster Image Processing", IBM Technical Disclosure Bulletin, Volume 15, No. 12 (May 1973), pp. 3879-3883. Nolan describes a process for deciding whether a given run length of contiguous black pixels in the image should be classified as a graphical line to be discarded by determining whether it corresponds to a similar run length of black pixels in the preceding scan line which was previously identified as a graphical or non-text line.

The speckle removal module 220 may be created using well known filter techniques. It should be appreciated that simple image processing filters, such as low-pass, median or morphological filters are not adequate for removing speckle-type noise. These filters either distort the original image, or do not affect the speckle noise. The adaptive filters defined as a function proportional to the local information content of an image (such as local normalized variance: variance/mean) can successfully suppress speckle-type noise, without distorting the original image. In this regard, the LLLMMSE filter ("Local Linear Minimum Mean Standard Error Filter") removes speckle over homogeneous areas with speckle noise, whereas edges and high-contrast features are preserved, as described in Aiazzi, B. et al. "Multi-resolution Adaptive Speckle Filtering: A Comparison of Algorithms," Proceedings of the 1997 IEEE International Geoscience and Remote Sensing Symposium, IGARSS '97, Part 2 (of 4), Singapore, Singapore; International Geoscience and Remove Sensing Symposium (IGARSS) v 2 1997, IEEE, Piscataway, N.J., USA, 97CH36042, pp. 1054-1056 and Kodidis, Eleftherios et al. "Nonlinear Adaptive Filters For Speckle Suppression in Ultrasonic Images," Signal Processing, Signal Processing v 52 n3 August 1996, pp. 357-372.

The subtraction module 230 uses well known subtraction techniques to subtract enhanced binary text image from the binary image data to generate a non-text binary image data.

Figure 3:
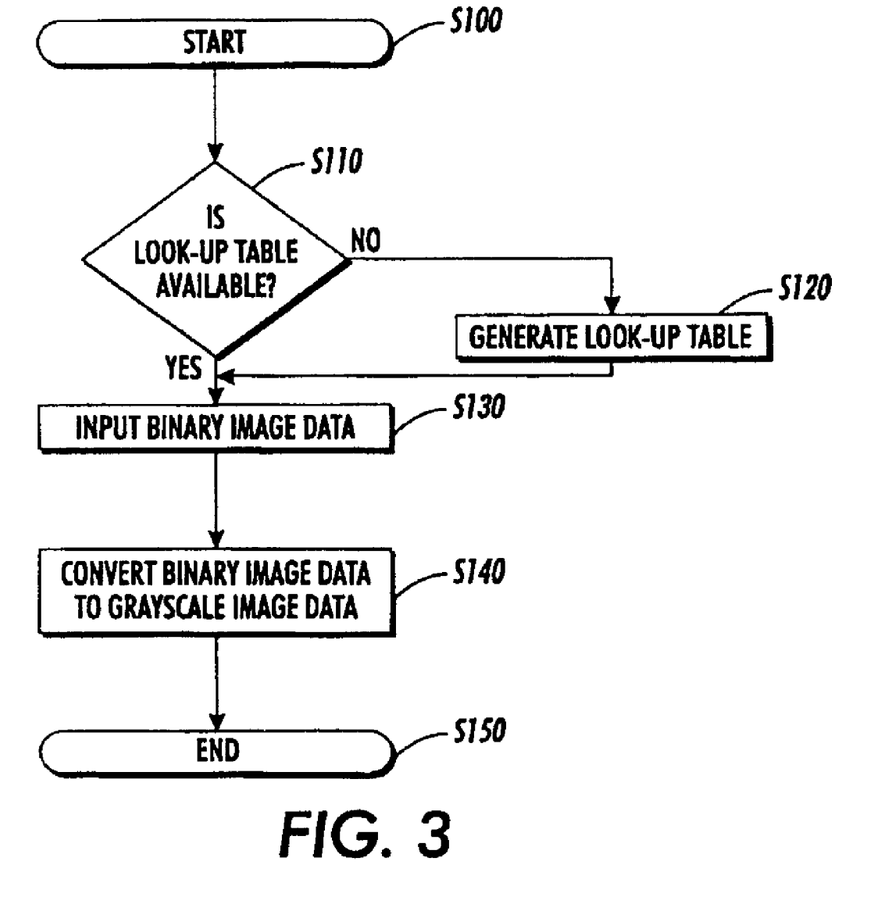
FIGS. 3-4 are flowcharts outlining an exemplary operation of the binary image data to gray scale image data converter module of FIG. 2.
Figure 4:
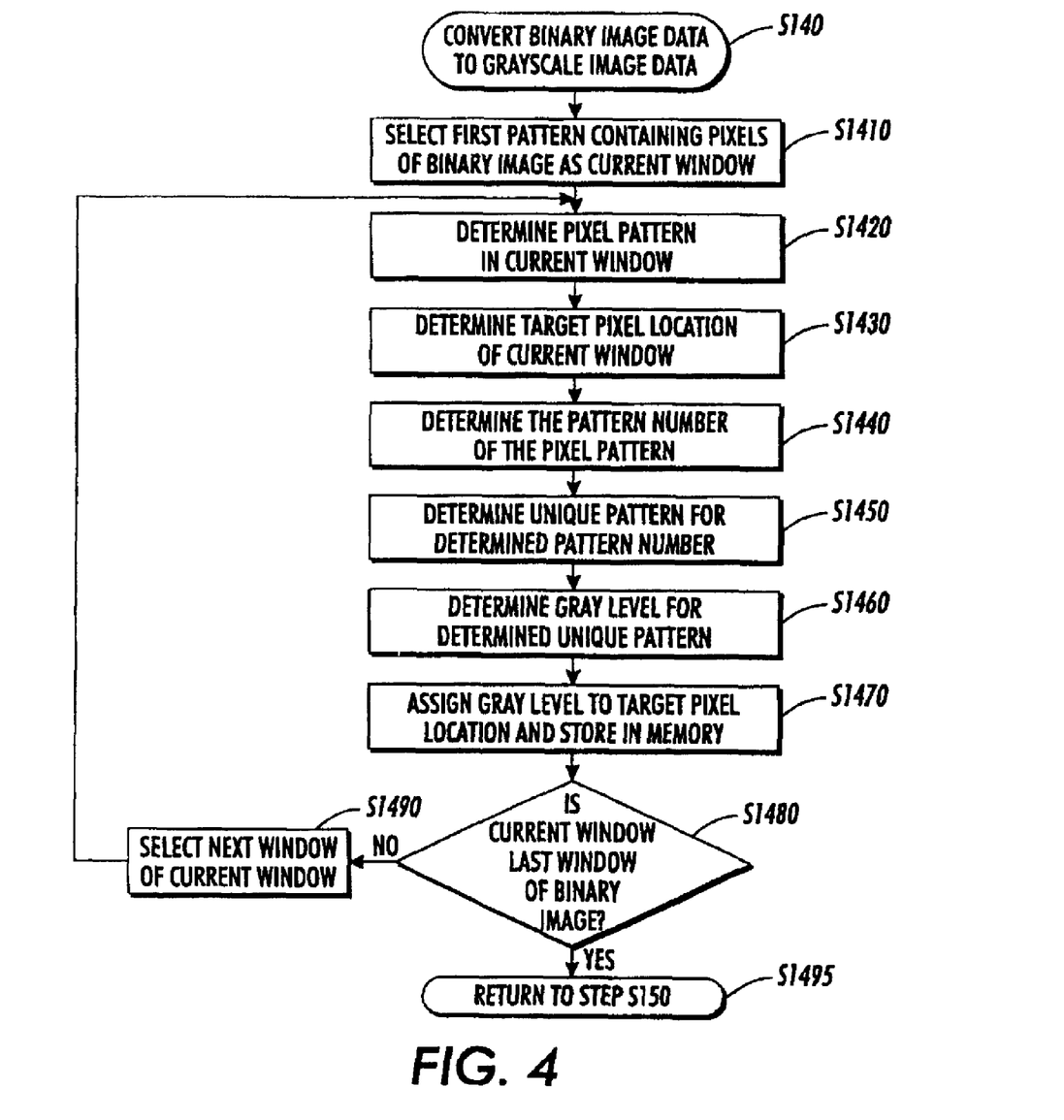

FIGS. 3-4 are flowcharts outlining an exemplary operation of the binary image data to gray scale image data converter module 240. The operation assumes that lookup tables to convert binary image data to gray scale image data are already generated. It should be appreciated that a set of look-up tables can be generated during a training operation for each of various different types of halftoning methods. A training operation is performed at least once for each type of halftoning. An example of a training operation may be found in U.S. Pat. No. 6,343,159 B1 to Cuciurean-Zapan et al., which is incorporated herein by reference in its entirety, and will not be further discussed here.

During binary image data to gray scale image data conversion, an appropriate look-up table is selected to convert a received binary image data into gray scale image data. The selection of the appropriate look-up table may be accomplished using any one of a variety of known or later developed techniques. For example, the look-up table could be selected based simply on a user's input or based on the characteristics of the output device that printed the binary image. Alternatively, the selection of the look-up table may be based on an analysis of the binary image, such as, for example, a segmentation analysis performed on the input image to determine the halftoning method. If no information could be gathered about the input binary image, a generic look-up table may be used to convert the gray scale image.

Referring now to FIG. 3, the operation starts at step S100 and continues to step S110. In step S110, a decision is made whether an appropriate look-up table is available for the type of halftoning used in the binary image to be converted. If an appropriate look-up table is not available, operation continues to step S120. In step S120, the appropriate look-up table is generated. The look-up table may be generated, for example, using the teachings of U.S. Pat. No. 6,343,159 B1 to Cuciurean-Zapan et al. Operation then continues to step S130. Otherwise, if a look-up table is available, operation continues directly to step S130. In step S130, binary image data is received. Next, in step S140, the binary image data is converted to gray scale image data. The operation then continues to S150, where the operation ends.

FIG. 4 is a flowchart outlining in greater detail one exemplary embodiment of converting the binary image data to gray scale image data of step S140 of FIG. 3. Starting at step S140, operation continues to step S1410. In step S1410, the first portion of the binary image containing pixels is selected as the current window to be analyzed. Then, in step S1420, the pixel pattern in the current window is determined. Next, in step S1430, the target pixel location of the current window is determined. Operation then continues to step S1440.

In step S1440, the original pattern number of the pixel pattern observed in the current window is determined. Then, in step S1450, the unique pattern that is associated with the determined original pattern number is determined. Next, in step S1460, the gray scale value for the determined unique pattern is read from the look-out table. Next, in step S1470, the determined gray scale value is assigned to the target pixel location of the current window. Next, in step S1480, the current window of the binary image is analyzed to determine if the current window is the last window. If the current window is not the last window of the binary image, operation continues to step S1490. In step S1490, the next window of the binary image is selected. Operation then returns to step S1420. Otherwise, if the current window is the last window of the binary image, operation continues to step S150. Further details of binary image data to gray scale image data conversion may be found in U.S. Pat. No. 6,343,159 B1 to Cuciurean-Zapan et al., which is incorporated herein by reference in its entirety.

The optional enhancement filter module 260 may use various enhancement techniques to enhance the scaled non-text gray scale image data. Enhancement techniques may include luminance enhancement (e.g. U.S. Pat. No 5,450,502), sharpness enhancement (e.g., U.S. Pat. No. 5,363,209), exposure adjustment (e.g. U.S. Pat. No. 5,414,538), contrast enhancement (U.S. Pat. No. 5,581,370), etc. These processes can be used together in a predictive mode that does not require iterative processing (e.g. U.S. Pat. No. 5,347,374). In general, these processing methods operate by modifying a set of tonal reproduction curves (TRCs). U.S. Pat. No. 6,175,427 to Lehmbeck et al., which is incorporated herein by reference in its entirety, discloses a technique to enhance image data based on tonal correction on which the enhancement filter module 260 may be based.

The lossless compression module 270 may be created based on lossless compression schemes such as gzip or CCITT G3/G4. Alternatively token-based compression schemes like JBIG2 could also be applied. The lossy compression module 280 may be created based on lossy compression schemes such as JPEG, JPEG2000, etc. Lossless or lossy compression schemes are well known in the art and will not be further discussed.

Figure 5:
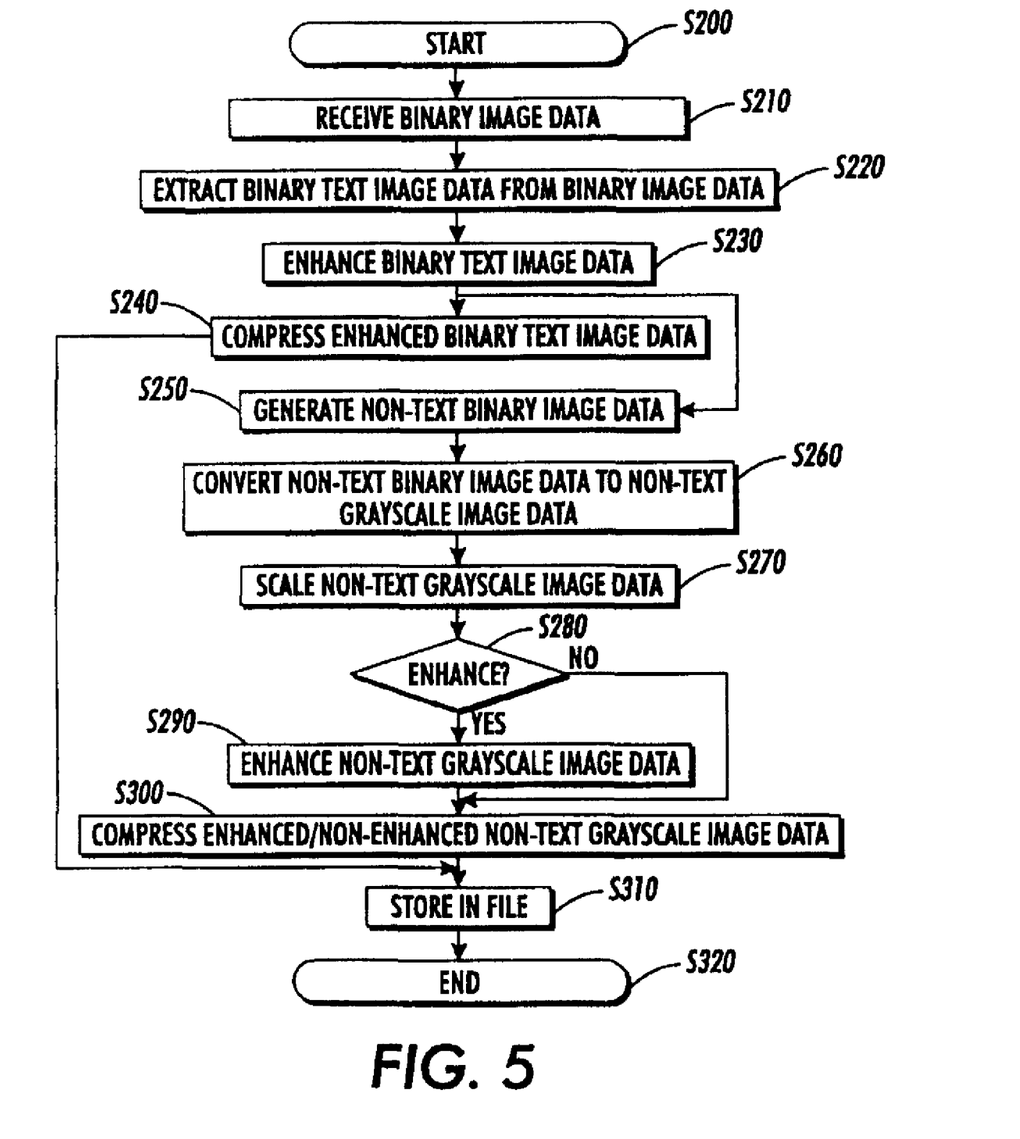
FIG. 5 is a flow chart outlining one exemplary method of reformatting binary image data to MRC format.

FIG. 5 is a flowchart outlining one exemplary method of reformatting binary image data to MRC format. The operation starts at step S200 and continues to step S210. In step S210, binary image data is received. Next, in step S220, binary text image data is extracted from the binary image data. Then, in step S230, speckle noise is removed from the binary text image data to generate an enhanced binary text image data, which becomes the high frequency plane of the MRC format. Next, in step S240, the enhanced binary text image data is compressed based on a lossless or token-based compression scheme. The operation continues to step S310.

In parallel with step S240, in step S250, the enhanced binary text image is subtracted from the binary image data to generate a non-text binary image data. Next, in step S260, the non-text binary image data is converted to non-text gray scale image data. The non-text gray scale image data becomes the background plane of the MRC format. In step S270, the non-text gray scale image data is scaled. Next, in step S280, a decision is made whether to enhance the non-text gray scale image data. If a decision is made to enhance the non-text gray scale image data, the operation continues to step S290. In step S290, enhancement is performed on the scaled non-text gray scale image data to generate an enhanced non-text gray scale image data. The operation then continues to step S300. Otherwise, if a decision is made not to enhance the non-text gray scale image data, the operation continues to step S300. In step S300, the non-text gray scale image data/enhanced non-text gray scale image data is compressed using a lossy compression scheme. The operation then continues to step S310, where one or more files are created that contain the compressed selector plane and the background plane.

Figure 6:
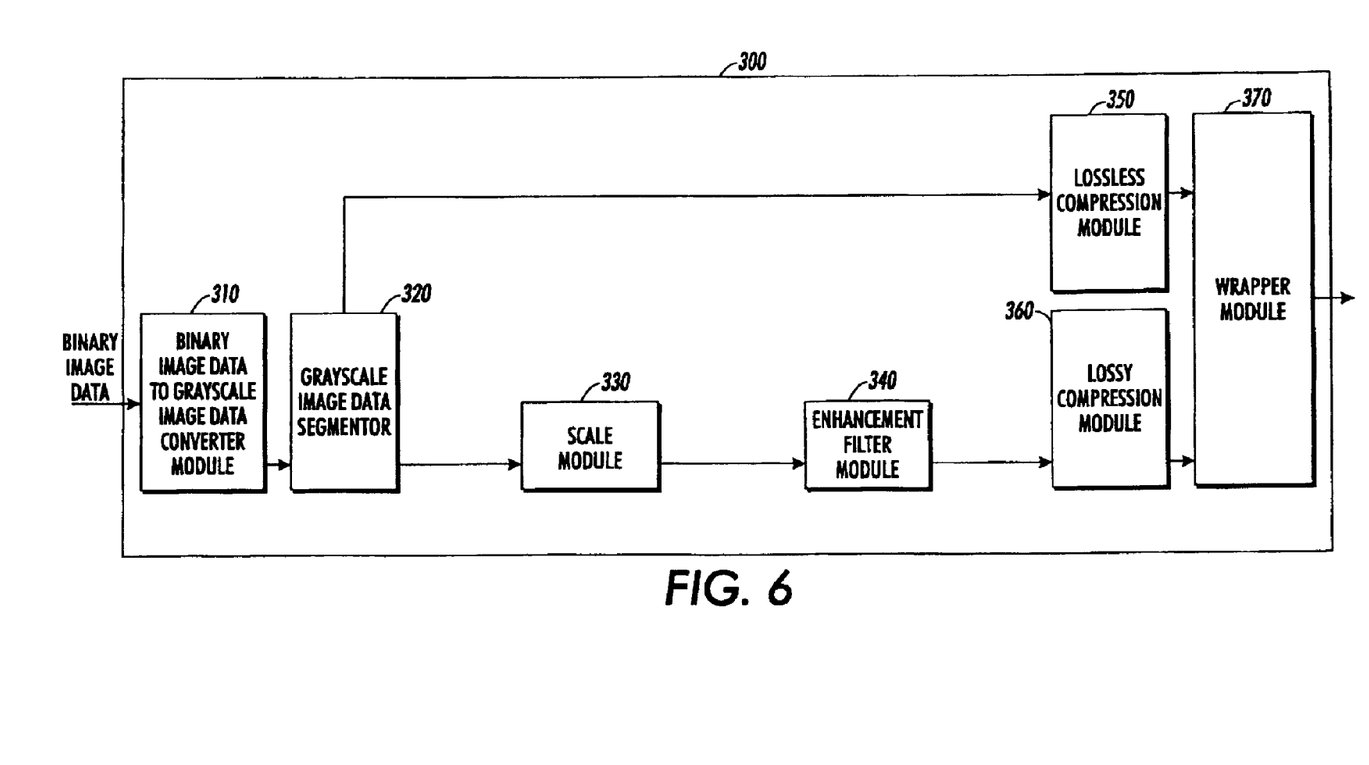
FIG. 6 is another exemplary functional block diagram of a binary image data to MRC format generating system.

FIG. 6 illustrates another binary image data to MRC format generating system 300 in accordance with an embodiment of the invention. The binary image data to MRC format generating system 300 includes a binary image data to gray scale image data converter module 310, a gray scale image data segmentor 320, an optional scale module 330, an optional enhancement filter module 340, a lossless compression module 350, a lossy compression module 360 and a wrapper module 370.

The binary image data to gray scale image data converter module 310 receives binary image data from a data source. The binary image data to gray scale image data converter module 310 converts the binary image data to gray scale image data. The gray scale image data segmentor 320 segments the gray scale image into high spatial frequency image data and low spatial frequency image data. The high spatial frequency image data becomes the high frequency plane 110'. The low spatial frequency image data becomes the background plane 120'. The high spatial frequency image data is sent to the lossless compression module 350. The lossless or token-based compression module 350 compresses the high spatial frequency image data, for example, using a CCITT G3/G4 or JBIG2 compression scheme. The compressed high spatial frequency image data is sent to the wrapper module 370.

The low spatial frequency image data is sent to the scale module 330. The scale module 330 and the enhancement filter module 340 are optional. The scale module 330 reduces the resolution of the low spatial frequency image data. The scaled low spatial frequency image data is sent to the enhancement filter module 340. The enhancement filter module 340 performs tonal correction to the scaled low spatial frequency image data. The enhanced low spatial frequency image data is sent to the lossy compression module 360. The lossy compression module 360 compresses the enhanced low spatial frequency image data to generate a compressed enhanced low spatial frequency image data, which is sent to the wrapper module 370. The wrapper module 370 creates one or more files which contain the compressed high spatial image data and the compressed enhanced low spatial frequency image data.

The binary image data to gray scale image data converter module 310, the scale module 330, the enhancement filter module 340, the lossless compression module 350 and the lossy compression module 360 may be similar to the binary image data to gray scale image data converter module 240, the scale module 250, the enhancement filter module 260, the lossless compression module 270 and the lossy compression module 280 of FIG. 2, respectively, and will not be discussed further.

Figure 7:
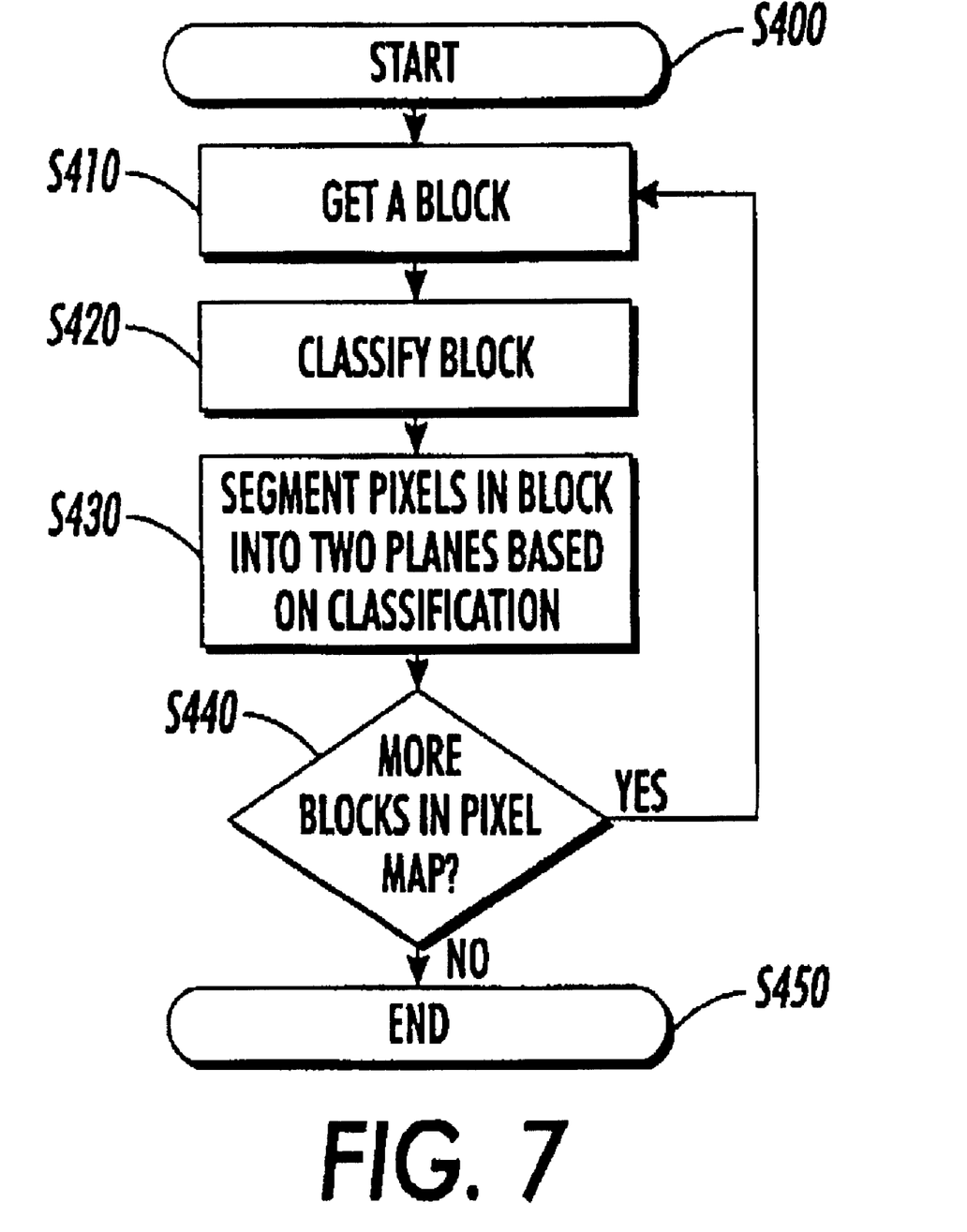
FIGS. 7-9 are flowcharts outlining an exemplary operation of a gray scale image data segmentor of FIG. 6.
Figure 8:
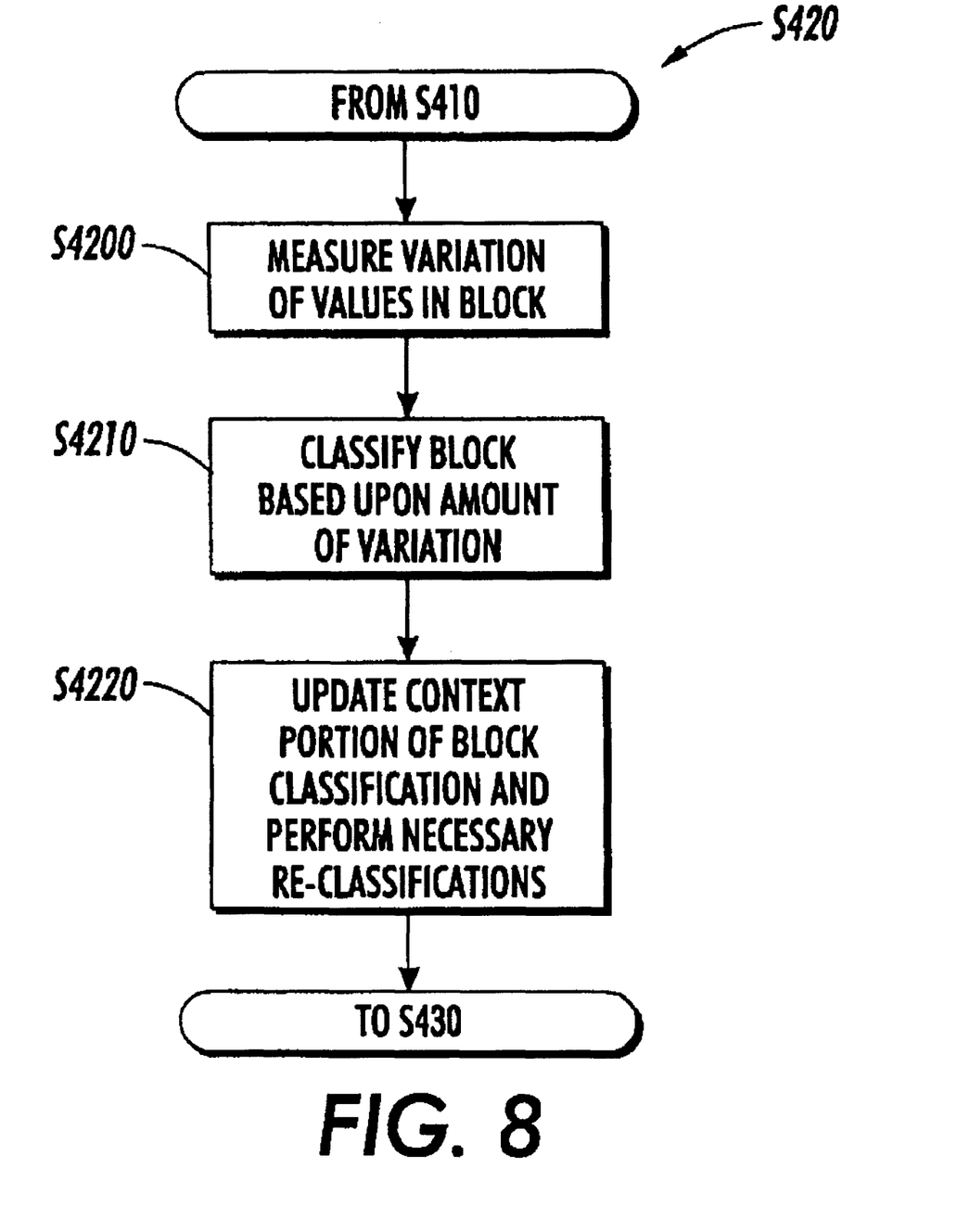
Figure 9:
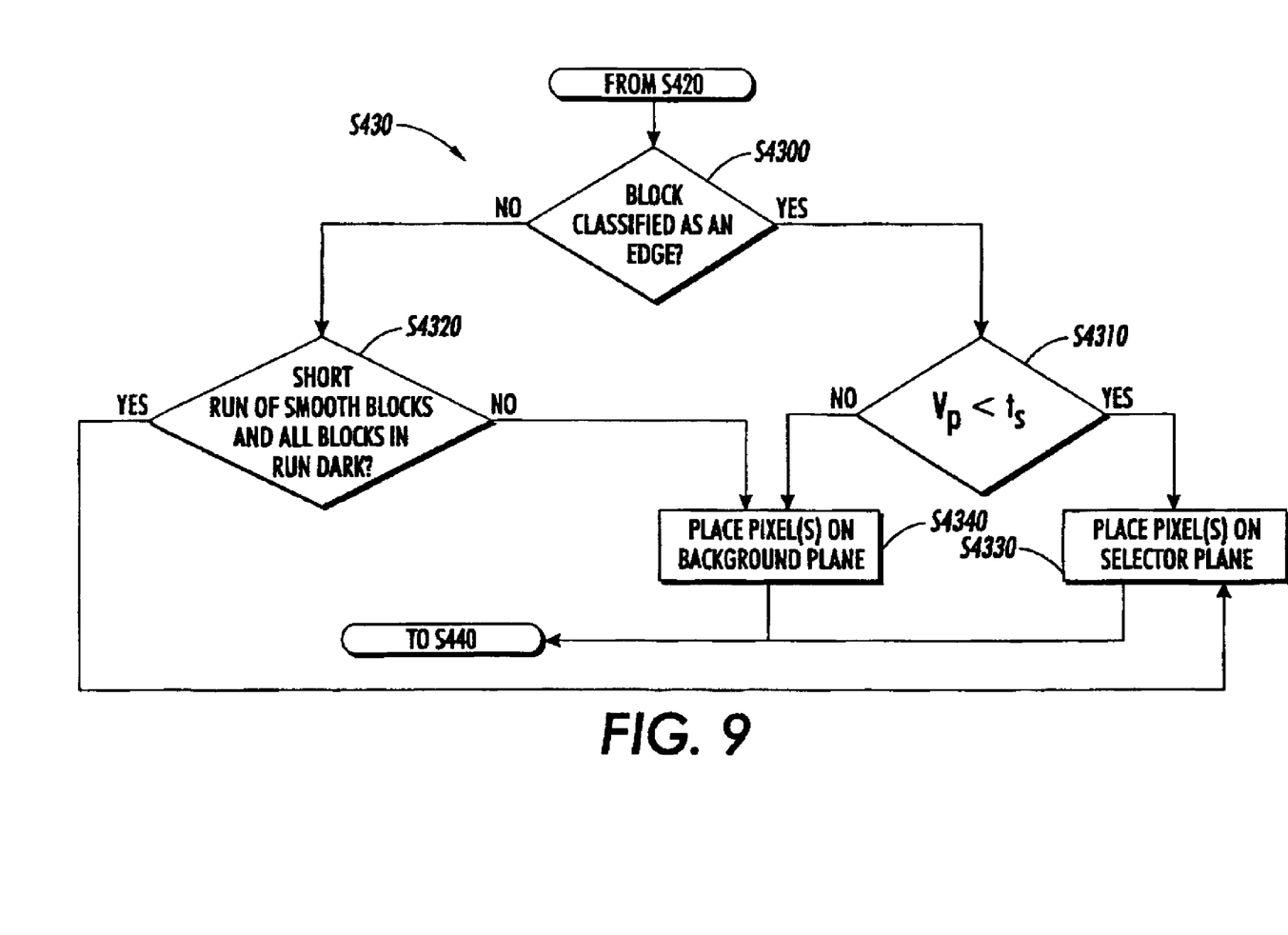

FIGS. 7-9 are flowcharts outlining an exemplary operation of the gray scale image data segmentor 320. A gray scale image data may be divided into a plurality of blocks for processing efficiency. Referring now to FIG. 7, the operation starts at step S400 and continues to step S410. In step S410, a block is received. Then, in step S420, the block is initially classified as either UNIFORM, SMOOTH, WEAK_EDGE or EDGE, and its context as either TEXT or NON-TEXT. The block is then be reclassified as either SMOOTH or EDGE, depending upon the initial classification and the context. Next, in step S430, pixels in the block are segmented and placed on either the high frequency plane 110' or the background plane 120' based on the classification of the block. The operation continues to step S440. In step S440, a decision is made whether there are any more blocks to be processed. If there are more blocks to be processed, then the operation continues to step S410. Otherwise, if all the blocks have been processed, the operation continues to step S450 where the operation ends.

FIG. 8 is a more detailed flowchart of step S420 of FIG. 7. As described above, a block is classified into one of four categories. Referring to FIG. 8, the operation starts at step S4200 where variation of pixel values within the block is determined. Block variation may be determined by using statistical measures. Further details of statistical measures may be found in U.S. Pat. No. 6,400,844 B1 to Fan et al. which is incorporated herein by reference. Blocks with large variations throughout are most likely to lie along edges of the image, while those containing little variations probably lie in uniform or at least smooth areas. Next, in step S4210, the block is classified based on the amount of variation. Measuring the variations within the block allows an initial classification to be assigned to the block. Then, in step S4220, image data within each block is reviewed in detail to allow context information (i.e. whether the region is in the text or non-text region of the image) to be updated and any necessary block re-classifications to be performed. The UNIFORM blocks are reclassified as SMOOTH, and the WEAK EDGE blocks are upgraded to EDGE in a TEXT context or reclassified as SMOOTH in a NON-TEXT context.

FIG. 9 is a more detailed flowchart of step S430 of FIG. 7. FIG. 9 describes the manner in which a block is segmented into two planes. The operation starts at step S4300 where measurement begins by first determining whether the block being processed has initially been classified as an EDGE. If so, the values $v_p$ of each pixel in the block are first compared to a brightness threshold value $t_s$, wherein pixels that have values equal to or above $t_s$ are viewed as "bright" pixels, while those with values below $t_s$ are "dark" pixels. An EDGE block is segmented by placing dark pixels on the high frequency plane 110' (step 4330) and placing bright pixels on the background plane 120' (step 4340).

If it is determined at step 4300 that the block is not an EDGE block, then the operation continues to step S4320. In step S4320, all pixels in the block are processed together, rather than on a pixel by pixel basis. Segmenting of SMOOTH (non-EDGE) pixels occurs as follows: if the block is in the midst of a short run of blocks that have been classified as SMOOTH, and further, all blocks in this short run are dark (v<t), then all pixels in the block is placed on the high frequency plane 110'. If the entire block is substantially smooth (i.e. in a long run) or is bright (in a short run of bright pixels), then all pixels in the block are placed on the background plane 120'. Further details of segmenting gray scale image data into text image data and non-text gray scale image data may be found in U.S. Pat. No. 6,400,844 B1 to Fan et al., which is incorporated herein by reference in its entirety.

Figure 10:
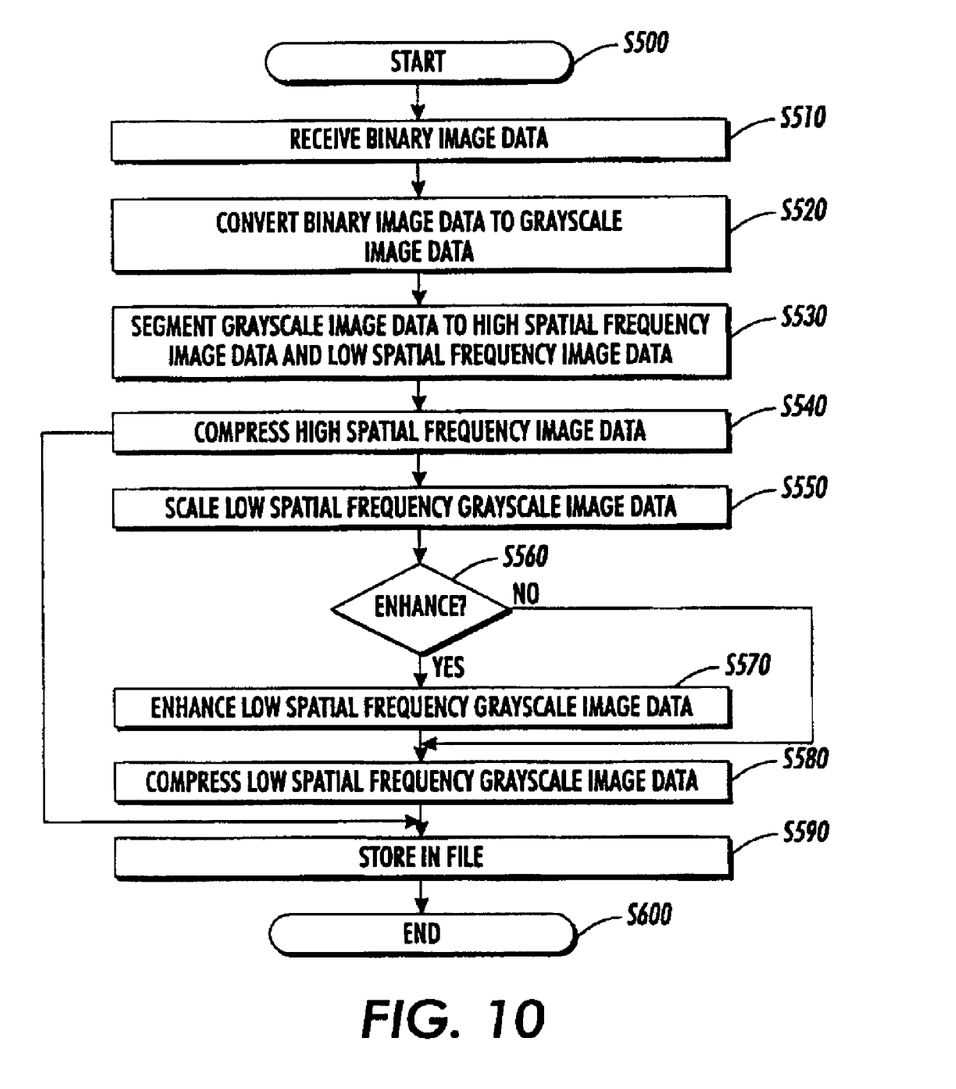
FIG. 10 is a flow chart outlining one exemplary method of reformatting binary image data to MRC format.

FIG. 10 is a flowchart outlining the another exemplary method of reformatting binary image data to MRC format. The operation starts at step S500 and continues to step S510. In step S510, binary image data is received. Next, in step S520, binary image data is converted to gray scale image data. Then, in step S530, the gray scale image data is segmented into high spatial frequency gray scale image data and low spatial frequency gray scale image data. The high spatial frequency gray scale image data becomes the high frequency plane 110'. The low spatial frequency gray scale image data becomes the background plane 120'. Next, in step S540, the high spatial frequency gray scale image data is compressed using a lossless or token-based compression scheme. The operation continues to step S590.

In parallel, in step S550, the low spatial frequency gray scale image data is scaled. Then, in step S560, a decision is made whether to enhance the low spatial frequency gray scale image data. If a decision is made to enhance the low spatial frequency gray scale image data, the operation continues to step S570. In step S570, enhancement is performed on the scaled low spatial frequency gray scale image data to generate an enhanced low spatial frequency gray scale image data. The operation then continues to step S580. Otherwise, if a decision is made not to enhance the low spatial frequency gray scale image data, the operation continues to step S580. In step S580, the low spatial frequency gray scale image data/enhanced low spatial frequency gray scale image data is compressed using a lossy compression scheme. The operation then continues to step S590, where one or more files are created containing the compressed selector plane and the background plane.

It should be understood that various embodiments have been described based on reformatting binary images to 2-layer MRC files containing one high frequency and one background plane. However, it should be appreciated that reformatting binary images includes multi-mask MRC containing multiple mask planes for the different "gray" text in a page and a single background plane.

It should be appreciated that, in various exemplary embodiments, the binary image data to MRC format generating system of FIGS. 2 and 6 can be implemented as software executing on a programmed general purpose computer. Likewise, the binary image data to MRC format generating system of FIGS. 2 and 6 can also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. Each of the various signal lines as shown in FIGS. 2 and 6 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to FIGS. 2 and 6.

It should be understood that each of the modules which can also be circuits, routines, applications or the like can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the modules which can be circuits, routines, applications, objects, procedures, managers and the like can be implemented as portions of a suitably programmed general purpose computer. Alternatively, each of the circuits, routines, applications, objects, procedures, managers and/or modules can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules will take is a design choice and it will be obvious and predictable to those skilled in the art. It should be appreciated that the circuits, routines, applications, objects, procedures, managers and/or modules do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing can be performed by a computer executing one or more appropriate programs, by special purpose hardware designed to perform the method, or any combination of such hardware, firmware and software elements.

While the invention has been described in conjunction with various exemplary embodiments, these embodiments should be viewed as illustrative, not limiting. Various modifications, substitutes, or the like are possible within the spirit and scope of the invention.

What is claimed is:

1. A method for reformatting binary image data, comprising:
   extracting text binary image data from binary image data;
   removing speckle noise from the text binary image data to generate an enhanced text binary image data in a first plane;
   compressing the enhanced text binary image data in the first plane, and in parallel, subtracting the enhanced text binary image data from the binary image data to generate non-text binary image data in a second plane;
   converting the non-text binary image data in the second plane into non-text gray scale image data in the second plane; and
   compressing the non-text gray scale image data in the second plane.

2. The method of claim 1, further comprising:
   enhancing the non-text gray scale image data in the second plane.

3. A non-transitory computer readable medium being encoded to perform the method of claim 1.

4. An apparatus to reformat binary image data, comprising:
   an extractor device to extract text binary image data from the binary image data to a first plane;
   a first filter device to remove speckle noise from the text binary image data to generate an enhanced text binary image data in the first plane;
   a first compressor device to compress the enhanced text binary image data in the first plane, and in parallel, a subtractor device to subtract the enhanced text binary image data from the binary image data to generate a non-text binary image data in a second plane;
   a converter device to convert the non-text binary image data in the second plane into non-text gray scale image data in the second plane; and
   a second compressor device to compress the non-text gray scale image data in the second plane.

5. The apparatus of claim 4, further comprising:
   a second filter to enhance the non-text gray scale image data in the second plane.

6. A marking device incorporating the apparatus of claim 4.

7. A digital photocopier incorporating the apparatus of claim 4.

8. A stand alone document scanner or a multifunctional device incorporating the apparatus of claim 4.

* * * * *